United States Patent Office
3,093,634
Patented June 11, 1963

3,093,634
PREPARATION OF α-NITROLACTAMS
Johannes H. Ottenheym, Sittard, and Johan P. H. von den Hoff, Geleen, Netherlands, assignors to Stamicarbon N.V., Heerlen, Netherlands
No Drawing. Filed Sept. 10, 1959, Ser. No. 839,080
Claims priority, application Netherlands Sept. 30, 1958
6 Claims. (Cl. 260—239.3)

The present invention relates to the preparation of α-nitrolactams.

The α-nitrolactams of the present invention are lactams which have been substituted in the molecule so that one of the hydrogen atoms bound to the α-carbon atom has been replaced by a nitro group. The α-nitrolactams described and claimed herein have so far not been described in the literature. These new compounds cannot be obtained by subjecting lactams to any treatment known hitherto.

According to the present invention, it has been found that α-nitrolactams can be obtained, in practically theoretical yields, by hydrolyzing 3.nitro-azacyclo-alkanone-2-N-carbochloride by means of water at a temperature of at least 50° C.

The process according to the invention can be carried out in a simple way by suspending the carbochloride, which is used as starting material, in water at the said temperature, whereby hydrolysis takes place with simultaneous evolution of carbon dioxide gas and formation of hydrogen chloride. By raising the temperature, the hydrolysis is accelerated. Preferably, the hydrolysis is carried out at a temperature of 50–100° C. In this way, the hydrolysis may be completed in a short time, usually is not more than half an hour.

The present α-nitrolactams are only slightly soluble in water. Accordingly, they are obtained in the hydrolysis as a suspension in water. From this suspension, the desired reaction product, which is solid, can be easily separated, for instance, by filtration, and then washed with water. From the aqueous liquid, the dissolved α-nitrolactam can be extracted by means of a solvent, e.g. methyl-ethyl ketone. The separation of the α-nitrolactams and the aqueous liquid can be improved by dissolving salts, e.g. ammonium sulphate, in the aqueous phase.

According to a preferred aspect of the invention, the starting material is the 3.nitro-azacyclo-alkanone-2-N-carbochloride reaction product which is obtained from azacyclo-2.3.alkene-2.chloro-N-carbochloride by treating the latter with a nitrating acid, and which still contains some acid. In this case, the starting material need not be purified, the acid therein being dissolved during the hydrolysis.

In the 3.nitro-azacyclo-alkanone-2-N-carbochlorides, which are used according to the invention, the number of carbon atoms of the alkanone group can be varied and may, for instance, be 5, 6 or 7 carbon atoms. Suitable compounds are, for instance, 3.nitro-azacyclo-hexanone-2-N-carbochloride and 3.nitro-azacycloheptanone-2-N-carbochloride. The alkanone group may also contain more carbon atoms, for instance, 10, 11 or 12 carbon atoms. From these 3-nitro-azacylcloalkanone-2-N-carbochlorides, the corresponding α-nitrolactams are formed as confirmed by analysis and optical examination.

The α-nitrolactams described herein are of importance for the preparation of medicines, especially analeptics, due to their pharmacological activity. These nitrolactams may also be used for the preparation of α-aminolactams by the process described and claimed in U.S. application Serial No. 839,076 filed on even date herewith now Patent No 3,048,580 on behalf of Johannes H. Ottenheym and Pieter J. Kerkhoffs. The starting materials used herein may be prepared by the process described in our copending application Serial No. 839,074, now Patent No. 3,031,443, filed on even date herewith.

The invention is further described, but not limited, by the following examples:

Example 1

110 g. of 3.nitro-azacyclo-heptanone-2-N-carbochloride are suspended in 300 ml. of water in a 2 liter beaker. The suspension is heated at 95° C. and stirred from time to time. After 20 minutes, no more carbon dioxide gas evolves and the hydrolysis is completed.

The suspension is then filtered and the solid reaction product washed with water and dried. In this way, 74.5 g. of α-nitrocaprolactam are obtained. The aqueous solution is extracted four times with 50 ml. of methyl-ethyl ketone and from the solutions thus obtained another 3.9 g. of α-nitro-caprolactam are recovered after the liquid has been removed.

78.4 g. of product are obtained which corresponds to a yield of 99.5%.

Example 2

194 g. of azacyclo-2.3-heptene-2-chloro-N-carbochloride are slowly added, in fifteen minutes, with simultaneous stirring, to 540 g. of nitrating acid, while the temperature is kept below 30° C. The nitrating acid used is a mixture of 130 g. of 99% by weight of nitric acid and 410 g. of 96% by weight of sulphuric acid. After the carbochloride has been added, the mixture is stirred for another 10 minutes. Then, the reaction mixture is slowly distributed in 1.5 liters of water, which results in a suspension which is stirred for half an hour at a temperature of 70–80° C. Then, the suspension is cooled to 20–25° C. and 1,100 g. of ammonium sulphate are dissolved in the aqueous phase, after which the solid substance is separated from the aqueous phase by filtration and washing and then dried.

In this way 148 g. of α-nitrocaprolactam are obtained.

From the aqueous phase another 4 g. of α-nitrocaprolactam are extracted by means of methyl-ethyl ketone.

152 g. of product are obtained which corresponds to a yield of 96.2% calculated on the amount of carbochloride used as starting material.

Having described the invention, what is claimed as new is:

1. A process for the preparation of α-nitrolactam which comprises hydrolyzing 3,nitro-azacyclo-alkanone-2-N-carbochloride containing up to 12 carbon atoms in the alkanone group with water at a temperature between 50° C. and 100° C.

2. The process of claim 1 wherein said treatment with water is carried out at a temperature between 70 and 80° C. for a period of time up to one-half hour and until carbon dioxide evolution ceases.

3. The process of claim 1 wherein the α-nitrolactam is separated by filtering from the aqueous suspension resulting from said treatment with water, ammonium sulphate is added to the remaining aqueous extract and additional α-nitrolactam recovered from said extract.

4. A process for the preparation of α-nitrocaprolactam which comprises hydrolyzing 3.nitro-azacyclo-heptanone-2-N-carbochloride by heating the same in suspension in water at a temperature between 50 and 100° C. and until carbon dioxide evolution ceases.

5. A process for the preparation of α-nitro-lactam which comprises hydrolyzing 3.nitro-azacyclo-alkanone-2-N-carbochloride containing up to 12 carbon atoms in the alkanone group with water at a temperature of at least 50° C.

6. A process for the preparation of α-nitrolactam which comprises hydrolyzing 3,nitro-azacyclo-alkanone-2-N-carbochloride containing up to 12 carbon atoms in the alkanone group with water at a temperature between 50° C. and 100° C., the 3,nitro-azacyclo-alkanone-2-N-carbochloride comprising the reaction product obtained by treating the corresponding azacyclo-2,3,alkene-2,chloro-N-carbochloride with a nitrating acid mixture of sulphuric acid and nitric acid.

References Cited in the file of this patent
UNITED STATES PATENTS 2,933,491    Klager _____ Apr. 19, 1960